US011891051B2

(12) United States Patent
Matsuda et al.

(10) Patent No.: US 11,891,051 B2
(45) Date of Patent: Feb. 6, 2024

(54) PARKING ASSIST DEVICE

(71) Applicant: Hitachi Astemo, Ltd., Hitachinaka (JP)

(72) Inventors: Satoshi Matsuda, Hitachinaka (JP);
Masashi Seimiya, Hitachinaka (JP);
Akitoshi Miyazaki, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 122 days.

(21) Appl. No.: 17/619,091

(22) PCT Filed: Jun. 5, 2020

(86) PCT No.: PCT/JP2020/022262
§ 371 (c)(1),
(2) Date: Dec. 14, 2021

(87) PCT Pub. No.: WO2020/255747
PCT Pub. Date: Dec. 24, 2020

(65) Prior Publication Data
US 2022/0250611 A1  Aug. 11, 2022

(30) Foreign Application Priority Data
Jun. 21, 2019 (JP) .................... 2019-115475

(51) Int. Cl.
*B60W 30/06* (2006.01)
*B60W 30/045* (2012.01)

(52) U.S. Cl.
CPC .......... *B60W 30/06* (2013.01); *B60W 30/045* (2013.01); *B60W 2556/25* (2020.02); *B60W 2556/30* (2020.02)

(58) Field of Classification Search
CPC ............... B60W 30/06; B60W 30/045; B60W 2556/25; B60W 2556/30; B60W 30/0956; B62D 15/0285; B60R 99/00; G08G 1/16
See application file for complete search history.

(56) References Cited

U.S. PATENT DOCUMENTS

2020/0081446 A1  3/2020 Ishinoda et al.
2021/0107464 A1* 4/2021 Ishinoda ............ B62D 15/0285

FOREIGN PATENT DOCUMENTS

JP  2004-352110 A  12/2004
JP  2005-035499 A   2/2005
(Continued)

OTHER PUBLICATIONS

International Search Report, PCT/JP2020/022262, dated Oct. 6, 2020 (2 pgs).

*Primary Examiner* — Daryl C Pope
(74) *Attorney, Agent, or Firm* — Volpe Koenig

(57) ABSTRACT

A parking assist device capable of parking assistance that ensures high accuracy of a parking location is provided. A parking assist device that assists in performing an operation of parking a vehicle includes a parking-allowing location calculation unit that before the vehicle stops at a parking-allowing location, calculates and updates the parking-allowing location a plurality of times, and a parking route calculation unit that calculates a parking route. The parking route calculation unit sets a minimum turning radius for calculating the parking route, based on the amount of a shift between the parking-allowing location not updated and the parking-allowing location having been updated, and calculates the parking route, using the minimum turning radius. The minimum turning radius is set larger than the minimum value of a turning radius unique to the vehicle.

7 Claims, 10 Drawing Sheets

(56) References Cited

FOREIGN PATENT DOCUMENTS

| JP | 2018-039293 A | 3/2018 |
| JP | 2018-176911 A | 11/2018 |

\* cited by examiner

PARKING ASSIST DEVICE

TECHNICAL FIELD

The present invention relates to a device that assists with a vehicle driving operation.

BACKGROUND ART

A parking assist device that assists a driver in performing control operations, such as operating a steering wheel, an accelerator, and a brake, has been widely known. When the driver parks a vehicle, this device assists the driver in steering the vehicle to a target parking location.

The parking assist device analyzes environmental information on the surroundings of the vehicle, the environmental information being acquired by an in-vehicle sonar or an in-vehicle camera in a parking lot, detects a place where the vehicle can be parked, and informs an in-vehicle display device, such as a navigation system, that the place where the vehicle can be parked has been detected. After stopping the vehicle, the driver selects a place to park from among available parking places displayed on the in-vehicle display device, as a target parking location, using an input means of the in-vehicle display device, and starts parking assist. The driver is thus assisted in performing a parking operation for parking the vehicle at the target parking location.

As an invention disclosing a technique for calculating a parking route to a target parking location, for example, an invention described in Patent Literature 1 is known. Patent Literature 1 describes the invention as follows: "In a vehicle travel assist device, such as a parking assist device, that determines a travel locus Lt2 to a target location G and assists a vehicle 200 in traveling so as to allow it to follow the travel locus Lt2, a turning radius, which is used for calculating the travel locus, is limited to set a route with a large turning radius in the initial stage so that a degree of freedom in resetting the route is improved even when a shift in route setting arises."

CITATION LIST

Patent Literature

PLT 1: Japanese Patent Application Laid-Open No. 2004-352110

SUMMARY OF INVENTION

Technical Problem

A conventional parking assist device, when calculating a parking route, controls a vehicle to cause it to follow the parking route after the start of parking assist. In Patent Literature 1, a minimum turning radius used for calculating a parking route is determined to be larger than a minimum turning radius unique to a vehicle so that when the vehicle moves away from the parking route, the vehicle can be steered back to the parking route. This gives a steering amount a margin for adjustment, and, therefore, even when the vehicle moves away from the parking route after the start of parking assist, the vehicle can be steered back to the parking route.

A parking assist device using a camera and a sonar detects a parking frame line or a parking space present between parked vehicles, calculates a parking location relative to a vehicle so that the vehicle can be parked at a proper location based on the location of the parking frame line or parking space, and presents the parking location to a driver. Further, the parking assist device sets a parking location selected by the driver, as a target parking location, and performs control to steer the vehicle to the target parking location.

When the measurement accuracy of the camera or the sonar is poor, a shift between the actual location of the frame line or parking space and the target parking location arises, which leads to a problem of deterioration in the accuracy of the parking location. To deal with this problem, when the vehicle approaches the parking frame line or the parking space, the parking assist device detects the parking frame line or the parking space once again, thereby recalculating the target parking location on the basis of a detection result showing less shift between the location of the parking frame line or parking space and the target parking location. In this manner, it is widely known that even when the accuracy of detection of the parking frame line and the parking space is poor at the start of parking assist, the parking assist device improves the accuracy of the parking location.

However, when a variation in the target parking location is large, a steering angle for causing the vehicle to travel to the recalculated target parking location becomes insufficient, which also leads to the problem of deterioration in the accuracy of the parking location.

The present invention has been conceived in view of the above-described problems.

Solution to Problem

A typical example of the present invention disclosed herein is as follows. A parking assist device that assists in performing an operation of parking a vehicle, the parking assist device including: a parking-allowing location calculation unit that before the vehicle stops at a parking-allowing location that is a space where the vehicle can be parked, calculates and updates the parking-allowing location a plurality of times; and a parking route calculation unit that calculates a parking route leading from a current location of the vehicle to the parking-allowing location. The parking route calculation unit sets a minimum turning radius for calculating the parking route, based on an amount of a shift between the parking-allowing location not updated and the parking-allowing location having been updated, and calculates the parking route, using the minimum turning radius. The minimum turning radius is set larger than a minimum value of a turning radius unique to the vehicle.

Advantageous Effects of Invention

According to the present invention, a parking assist device capable of performing parking assist ensuring the high accuracy of a parking location can be achieved. Problems, configurations, and effects other than those described above will be clarified by the following description of embodiments.

DESCRIPTION OF EMBODIMENTS

Figure 1:
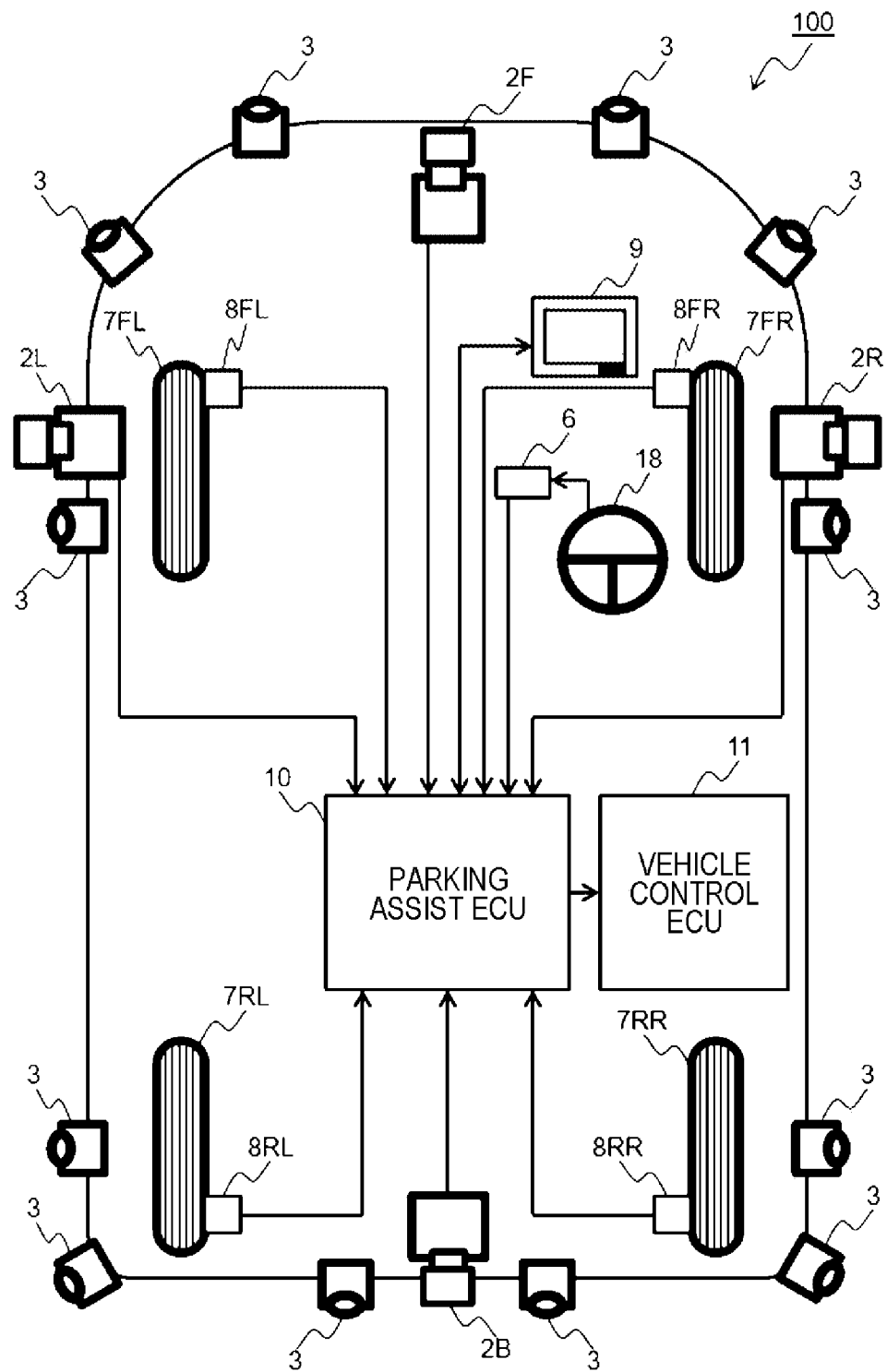
FIG. 1 is a diagram showing an example of a vehicle equipped with a parking assist device according to a first embodiment.

An embodiment of a parking assist device according to the present invention will hereinafter be described with reference to the drawings. It should be noted, however, that the present invention is not interpreted as the invention limited to the descriptive contents of embodiments described below. Those skilled in the art can easily understand that specific configurations of the invention may be changed or modified within a range in which changes/modification do not deviate from the concept and substance of the present invention.

In the configurations of the invention described below, the same or similar constituent elements or functions are denoted by the same reference signs, and redundant description will be omitted.

In this specification, such notations as "first", "second", and "third" are attached to constituent elements to identify them, and do not necessarily limit the number or order thereof.

The positions, sizes, shapes, ranges, and the like of constituent elements shown in drawings and the like may not represent the actual positions, sizes, shapes, ranges, and the like. This is to facilitate understanding of the invention. The constituent elements of the present invention, therefore, are not limited by the positions, sizes, shapes, ranges, and the like shown in the drawings and the like.

First Embodiment

A parking assist device according to a first embodiment can be applied to, for example, vehicles, such as passenger cars, trucks, and buses. The parking assist device according to the first embodiment can assist a driver in performing a parking operation, for example, when the driver parks a vehicle in a parking section in a parking lot.

FIG. 1 is a diagram showing an example of a vehicle equipped with the parking assist device according to the first embodiment.

The parking assist device is incorporated in a vehicle 100. The vehicle 100 mainly includes a front camera 2F mounted on the front side of the vehicle, a right camera 2R mounted on the right side of the vehicle, a rear camera 2B mounted on the rear side of the vehicle, a left camera 2L mounted on the left side of the vehicle, sonars 3, an electric power steering device 6, a right front wheel speed sensor 8FR that detects the wheel speed of a right front wheel 7FR, a right rear wheel speed sensor 8RR that detects the wheel speed of a right rear wheel 7RR, a left rear wheel speed sensor 8RL that detects the wheel speed of a left rear wheel 7RL, a left front wheel speed sensor 8FL that detects the wheel speed of a left front wheel 7FL, an in-vehicle display device 9, a parking assist ECU (Electronic Control Unit) 10, and a vehicle control ECU 11.

In the following description, the front camera 2F, the right camera 2R, the rear camera 2B, and the left camera 2L will be referred to as cameras 2 when distinguishing them from each other is not particularly necessary. The right front wheel 7FR, the right rear wheel 7RR, the left rear wheel 7RL, and the left front wheel 7FL will be referred to as wheels 7 when distinguishing them from each other is not particularly necessary. The right front wheel speed sensor 8FR, the right rear wheel speed sensor 8RR, the left rear wheel speed sensor 8RL, and the left front wheel speed sensor 8FL will be referred to as wheel speed sensors 8 when distinguishing them from each other is not particularly necessary.

It should be noted that the above configuration of the vehicle 100 is an exemplary one and therefore the configuration of the vehicle 100 is not limited to the above configuration. The parking assist device can be provided by, for example, the parking assist ECU 10 and the vehicle control ECU 11. The parking assist device may include such constituent elements as the cameras 2 and the sonars 3.

Each camera 2 includes a lens and an imaging element, and is disposed at a proper position so as to be able to capture an image of the surrounding environment of the vehicle 100. An image captured by the camera 2 is transmitted to the parking assist ECU 10, which processes the image. The camera 2 may be a monocular camera or a stereo camera.

A plurality of sonars 3 are installed on the front part, the rear part, and the sides of the vehicle 100, respectively. Each sonar 3 transmits an ultrasonic wave and receives a reflected wave, i.e., the ultrasonic wave reflected by an obstacle in the surroundings, thereby measuring a distance between the vehicle 100 and the obstacle, and transmits a result of the distance measurement to the parking assist ECU 10. The parking assist ECU 10 stores a distance measurement result transmitted from each sonar 3, as information on an obstacle in the surroundings of the vehicle 100.

The camera 2 and the sonar 3 make up an environmental information acquiring unit that acquires information on the surrounding environment of the vehicle 100. It should be noted that information on the surrounding environment of the vehicle 100 may be acquired using a sensing means different from the camera 2 and the sonar 3.

The right front wheel 7FR, the right rear wheel 7RR, the left rear wheel 7RL, and the left front wheel 7FL are arranged respectively on the right front side, the right rear side, the left rear side, and the left front side of the vehicle body of the vehicle 100. The wheels 7FR, 7RR, 7RL, and 7FL are provided with the right front wheel speed sensor 8FR, the right rear wheel speed sensor 8RR, the left rear wheel speed sensor 8RL, and the left front wheel speed sensor 8FL, respectively. Each of the wheel speed sensors 8FR, 8RR, 8RL, and 8FL detects the wheel speed of each wheel, and transmits each wheel speed to the parking assist ECU 10. The parking assist ECU 10 calculates the speed of the vehicle 100, based on received information on each wheel speed.

The electric power steering device 6 changes the direction of the wheels 7 according to an amount of operation (steering angle) of a steering wheel 18 provided in the cab of the vehicle 100.

The electric power steering device 6 includes, for example, a steering angle sensor (not illustrated) that detects a steering angle of the steering wheel 18, a motor (not illustrated) that adds an auxiliary torque to a steering torque serving as a torque for changing the direction of each wheel 7, and an electric power steering ECU (not illustrated) that controls the steering torque. The electric power steering device 6 controls the steering torque in such a way as to assist the driver in operating the steering wheel 18. The steering angle detected by the steering angle sensor of the electric power steering device 6 is transmitted to the parking assist ECU 10. Based on incoming information on the steering angle, the parking assist ECU 10 calculates the direction of travel of the vehicle 100.

The in-vehicle display device 9 is installed in the cab of the vehicle 100, and provides various pieces of information to the driver. The information provided to the driver includes, for example, an image that the parking assist ECU 10 has produced by processing an image captured by the camera 2. In addition, as it will be described later, the in-vehicle display device 9 presents a place (location) where parking is allowed, to the driver. The in-vehicle display device 9 may be configured as, for example, a touch panel composed of a display and an input device that are integrated together, or as a part of a car navigation system, or as a head-up display. The in-vehicle display device 9 may be equipped with information input gears, such as a keyboard, a voice instruction unit, and a switch. The in-vehicle display device 9 has a display functioning as a pressure-sensitive or electrostatic touch panel that allows various input operations. The driver carries out input operations on the touch panel, thus being able to transmit input contents to the parking assist ECU 10.

Based on environmental information received from the camera 2 and the sonar 3 making up the environmental information acquiring unit, the parking assist ECU 10 calculates a place (location) where the vehicle 100 can be parked, and calculates the location or the like of an obstacle present around the vehicle 100 as well. In the following description, a place (location) where parking is allowed will be referred to as a parking-allowing location.

The parking assist ECU 10 transmits information on a parking-allowing location calculated, to the in-vehicle display device 9. Based on the information received from the parking assist ECU 10, the in-vehicle display device 9 superimposes the parking-allowing location on surrounding environment information on the vehicle 100, the surrounding environment information being on display, and displays the parking-allowing location and surrounding environment information together. After the vehicle 100 stops, the driver selects one parking-allowing location out of parking-allowing locations displayed on the in-vehicle display device 9, thus being able to use a parking assist function. In the following description, a parking-allowing location selected by the user will be referred to as a target parking location.

Based on obstacle information and information of the target parking location, the parking assist ECU 10 calculates a route leading from the stop location of the vehicle 100 to the target parking location, as a parking route, and transmits information of the calculated parking route to the vehicle control ECU 11.

In a case where the parking-allowing location is calculated on the basis of a parking frame line included in an image acquired from the camera 2, the longer the relative distance between the camera 2 and the parking frame line, the higher a possibility of a shift between the actual location of the parking frame line and the detected location of the parking frame line, and this location shift tends to increase as the relative distance between the camera and the parking frame line increases. In a case where the parking-allowing location is calculated by detecting an obstacle, such as a parked vehicle, by the sonar 3, a similar problem arises. As the relative distance between the sonar 3 and the obstacle increases, a shift between the actual location of the obstacle and the detected location of the obstacle tends to increase.

To deal with this problem, the parking assist ECU 10 of the first embodiment continues a process of detecting the parking frame line or the parking space after the start of parking assist, and calculates the target parking location again. In addition, in response to update of the target parking location, the parking assist ECU 10 calculates the parking route again. In the first embodiment, to calculate a parking route through which a variation in the target parking location can be corrected, a minimum turning radius used for calculating the parking route is set or the length of a linear route added to a wheel-turning location included in the parking route is set. The wheel-turning location is a location at which the direction of travel of the vehicle 100 is changed from "forward" to "backward" or from "backward" to "forward".

The parking assist ECU 10 sets a parameter used for calculating the parking route so as to be able to correct a variation in the target parking location. The parking route calculated by using the parameter is a route in which a steering amount sufficient enough to allow the vehicle 100 to make a turn is ensured. Through this route, therefore, the vehicle 100 can be parked at the target parking location with high accuracy.

To provide help in steering the vehicle 100 to the target parking location, the vehicle control ECU 11 assists at least in operating the steering wheel 18, or in operating the accelerator, or in operating the brake, based on the parking route transmitted from the parking assist ECU 10.

For example, the vehicle control ECU 11 outputs target steering angle information to the electric power steering device 6, outputs a required driving force to a driving force control ECU (not illustrated) that controls the driving force of the vehicle 100, and outputs a required braking force to a braking force control ECU (not illustrated) that controls the braking force of the vehicle 100, thereby controlling the speed of the vehicle 100. In addition, the vehicle control ECU 11 outputs a drive range request, a reverse range request, or a parking range request to a shift-by-wire controller (not illustrated) that controls the shift range of an automatic transmission, thereby controlling the shift range of the vehicle 100. The vehicle control ECU 11 controlling the vehicle 100 allows the driver to receive proper parking assist during an operation for parking the vehicle 100 at the target parking location.

Figure 2:
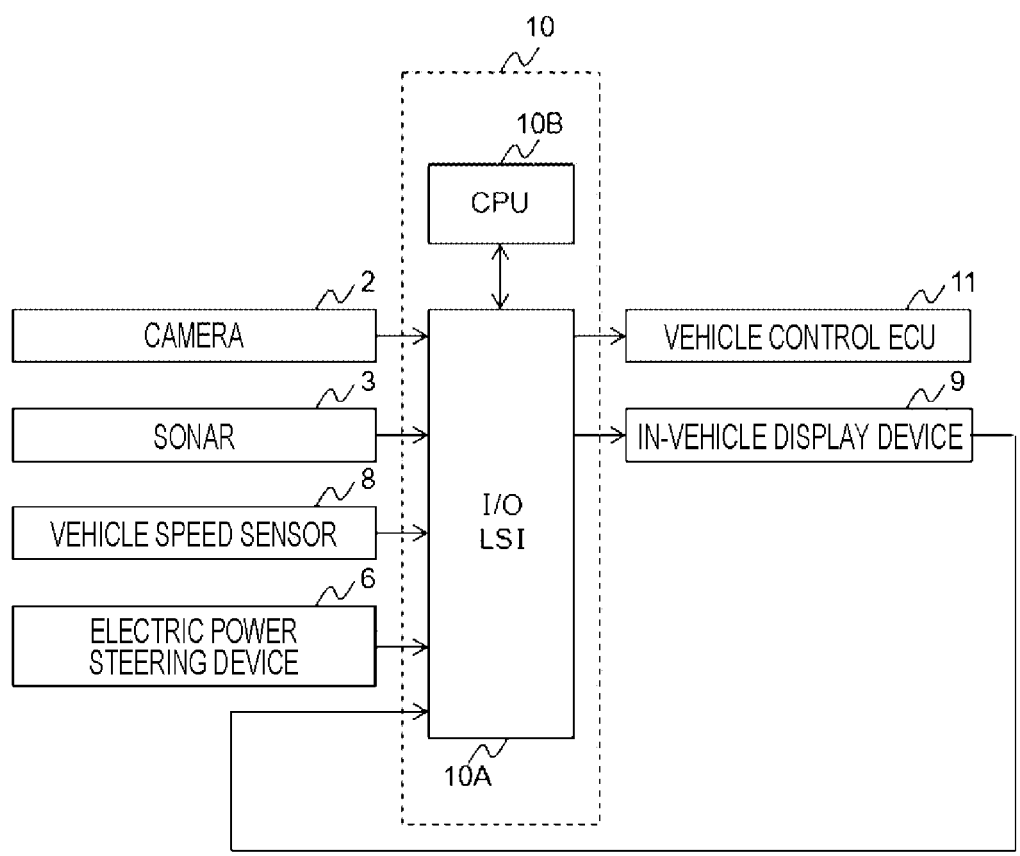
FIG. 2 is a diagram showing an example of a hardware configuration of a parking assist ECU according to the first embodiment.

FIG. 2 is a diagram showing an example of a hardware configuration of the parking assist ECU 10 according to the first embodiment. FIG. 2 also depicts a relationship between input/output signals to/from the parking assist ECU 10.

The parking assist ECU 10 is composed of an I/O LSI 10A including an A/D converter, a CPU 10B, and the like. The parking assist ECU 10 may include a storage device in the form of a memory tower (not illustrated).

As described with reference to FIG. 1, the parking assist ECU 10 receives incoming signals from the cameras 2, the sonars 3, the electric power steering device 6, the wheel speed sensors 8, and the in-vehicle display device 9. The parking assist ECU 10 transmits information of a parking-allowing location calculated by arithmetic processing, to the in-vehicle display device 9, thereby presenting the parking-allowing location to the driver. The driver checks the content of the information displayed on the in-vehicle display device 9, and determines whether or not to implement parking assist.

Figure 3:
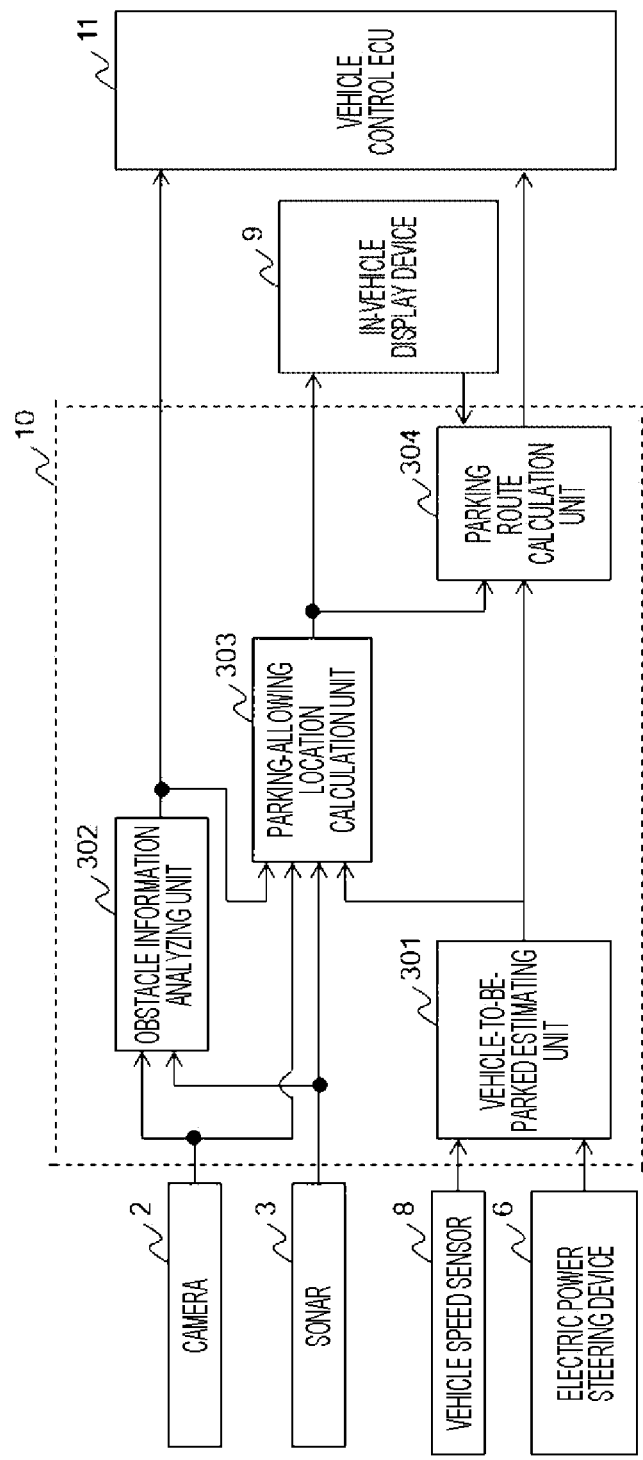
FIG. 3 is a diagram showing an example of a functional configuration of the parking assist ECU according to the first embodiment.

FIG. 3 is a diagram showing an example of a functional configuration of the parking assist ECU 10 according to the first embodiment.

The parking assist ECU 10 includes a vehicle-to-be-parked location estimating unit 301, an obstacle information analyzing unit 302, a parking-allowing location calculation unit 303, and a parking route calculation unit 304. Functions of the parking assist ECU 10 are implemented by hardware, software, or a combination thereof.

The vehicle-to-be-parked location estimating unit 301 calculates coordinates indicating the location of the vehicle 100, and transmits the calculated location coordinates of the vehicle 100 to the obstacle information analyzing unit 302 and the parking-allowing location calculation unit 303.

For example, the vehicle-to-be-parked location estimating unit 301 calculates the speed of the vehicle 100, using the wheel speed of each wheel 7, the wheel speed being received from the wheel speed sensor 8, and calculates the direction of travel of the vehicle 100, using a steering angle of the steering wheel 18, the steering angle being received from a steering angle sensor (not illustrated) of the electric power steering device 6. Further, the vehicle-to-be-parked location estimating unit 301 calculates the location coordinates of the vehicle 100, based on the calculated speed and the direction of travel of the vehicle 100. It should be noted that the above method of calculating the location coordinates of the vehicle 100 is an exemplary one and therefore the method is not limited to this exemplary method.

The obstacle information analyzing unit 302 analyzes environmental information on the surroundings of the vehicle 100, the environmental information being acquired by the camera 2 or the sonar 3, and calculates the coordinates, size, and the like of an obstacle present around the vehicle 100, based on a result of analysis of the location coordinates and the environmental information of the vehicle 100, the location coordinates and environmental information being received from the vehicle-to-be-parked location estimating unit 301. The obstacle information analyzing unit 302 transmits obstacle information indicating the coordinates, size, and the like of the obstacle, to the parking-allowing location calculation unit 303 and the parking route calculation unit 304.

Since a known technique may be used as a method of calculating the coordinates of the obstacle, the method will not be described in detail. When the distance between the vehicle 100 and the obstacle is measured using a sensor sensing sound waves, such as the sonar 3, a detected reflected wave may contain noise mixed therein. For this reason, the obstacle information analyzing unit 302 may determine whether an object detected as an obstacle is actually the obstacle, based on the length (continuity) of the object, and calculate the location of the object as obstacle coordinates. In addition, when analyzing an image acquired by the camera 2, the obstacle information analyzing unit 302 may identify an obstacle on the basis of a feature quantity extracted by edge detection or the like, and calculate the location of the obstacle as obstacle coordinates.

The parking-allowing location calculation unit 303 analyzes environmental information on the surroundings of the vehicle 100, the environmental information being acquired by the camera 2 or the sonar 3, and determines whether a space serving as a parking-allowing location is present around the vehicle 100, based on the location coordinates of the vehicle 100 received from the vehicle-to-be-parked location estimating unit 301, on obstacle coordinates received from the obstacle information analyzing unit 302, and on a result of analysis of the environmental information. When the above space is present, the parking-allowing location calculation unit 303 calculates the coordinates of the space, as the coordinates of the parking-allowing location.

For example, the parking-allowing location calculation unit 303 determines whether a space with a width, a length, and a height that are equal to or larger than the width, the length, and the height of the vehicle 100 is present around the vehicle 100, with reference to a parking frame line, a parking lot guide sign, and the like. When the above space is present, the parking-allowing location calculation unit 303 detects the space as a parking-allowing location, and transmits the coordinates of the parking-allowing location and a result of analysis of the surrounding environment of the parking-allowing location, to the parking route calculation unit 304, the in-vehicle display device 9, and the vehicle control ECU 11.

In the first embodiment, the environmental information on the surroundings of the vehicle 100 that has been acquired by the camera 2 or the sonar 3 is described as an example of input information. Information from a photosensor, however, may also be used as the environmental information.

Based on information received from the parking-allowing location calculation unit 303, the in-vehicle display device 9 superimposes information of the parking-allowing location on information on the surroundings of the vehicle 100, the information on the surroundings being displayed on the in-vehicle display device 9, and displays both information. The driver stops the vehicle 100, selects a parking-allowing location on a screen displayed on the in-vehicle display device 9, and gives an instruction to start parking assist by pressing a button or uttering the instruction. Information of the target parking location is transmitted to the parking route calculation unit 304.

When receiving a signal indicative of the instruction to start parking assist, the instruction being input to the in-vehicle display device 9, the parking route calculation unit 304 calculates a parking route leading from the stop position of the vehicle 100 to the target parking location, based on obstacle information received from the obstacle information analyzing unit 302, on information of the parking-allowing location received from the parking-allowing location calculation unit 303, and on information of the target parking location. A method of calculating the parking route will be described in detail later. The parking route calculation unit 304 transmits information of the calculated parking route to the vehicle control ECU 11.

The vehicle control ECU 11 controls the vehicle 100 in such a way as to cause the vehicle 100 to travel along the parking route calculated by the parking route calculation unit 304. As a result, the driver can receive proper parking assist during an operation for parking the vehicle 100 at the target parking location.

Figure 4:
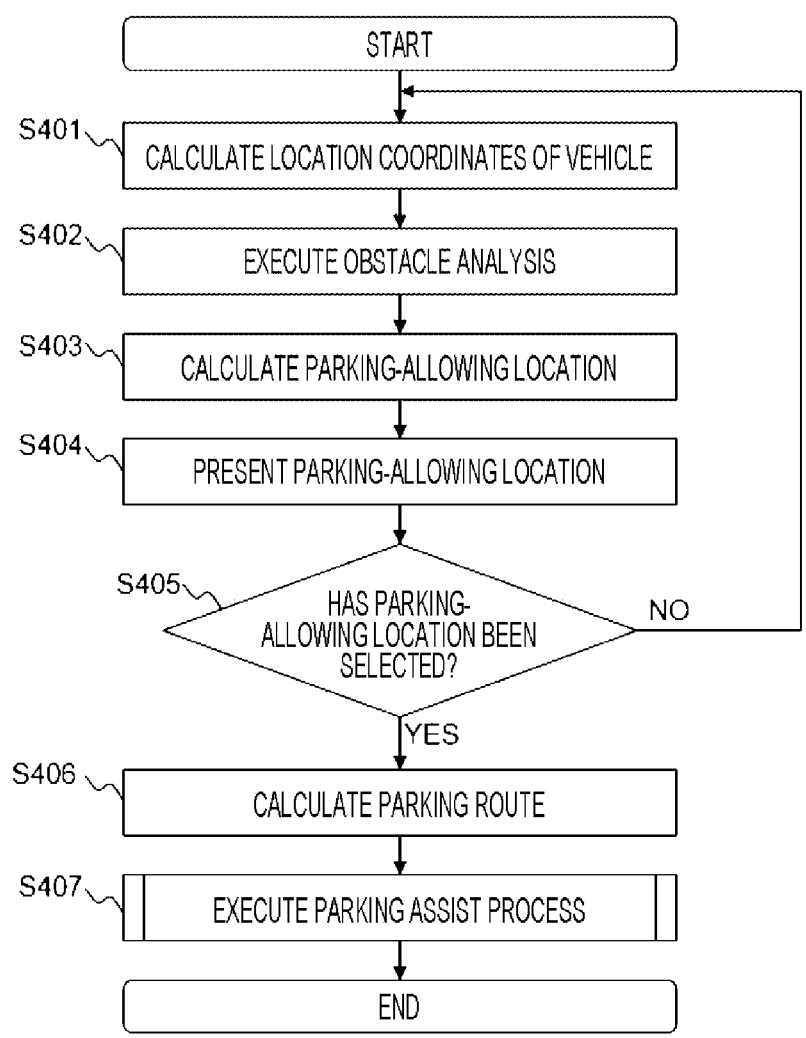
FIG. 4 is a flowchart for explaining an example of a process executed by the parking assist ECU according to the first embodiment.

FIG. 4 is a flowchart for explaining an example of a process executed by the parking assist ECU 10 according to the first embodiment.

While the driver is manually driving the vehicle 100, the parking assist ECU 10 calculates the location coordinates of the vehicle 100 (step S401).

Specifically, the parking assist ECU 10 calculates the speed of the vehicle 100, based on the wheel speed of each wheel 7 acquired from the wheel speed sensor 8, and calculates the direction of travel of the vehicle 100, based on a steering angle of the steering wheel 18 acquired from the steering angle sensor of the electric power steering device 6. Further, the parking assist ECU 10 calculates the location coordinates of the vehicle 100, based on the speed and the direction of travel of the vehicle 100.

Subsequently, the parking assist ECU 10 executes an analysis for detecting an obstacle, based on environmental information on the surroundings of the vehicle 100, the environmental information being acquired by the camera 2 or the sonar 3 (step S402).

Specifically, the parking assist ECU 10 analyzes the environmental information, and determines whether an obstacle is present, based on a result of the analysis. When the obstacle is present, the parking assist ECU 10 calculates the coordinates and the like of the obstacle, and creates obstacle information including the coordinates and the like of the obstacle.

Subsequently, the parking assist ECU 10 calculates a parking-allowing location, based on the environmental information and the obstacle information (step S403).

Specifically, the parking assist ECU 10 analyzes the environmental information, and determines whether a parking-allowing location is present, based on a result of the analysis and on the obstacle information. When the parking-allowing location is present, the parking assist ECU 10 calculates the coordinates of the parking-allowing location.

Subsequently, the parking assist ECU 10 transmits information of the parking-allowing location to the in-vehicle display device 9, thereby presenting the parking-allowing location to the driver (step S404).

Subsequently, the parking assist ECU 10 determines whether a parking-allowing location has been selected (step S405).

Specifically, the parking assist ECU 10 determines whether input to specify a target parking location has been made. When the above input is not made for a certain period of time, the parking assist ECU 10 determines that the parking-allowing location has not been selected. According to the first embodiment, the above instruction (input) is given when the vehicle 100 is standing still. Timing of giving the above instruction is, however, not limited to this.

When determining that the parking-allowing location has not been selected, the parking assist ECU 10 returns to step S401 and repeats the same process of step S401.

When determining that the parking-allowing location has been selected, the parking assist ECU 10 calculates a parking route leading from the current location of the vehicle 100 (stop location of the vehicle 100) to the target parking location (step S406).

As it will be described later, the parking assist ECU 10 according to the first embodiment calculates a first parking route by using parameters that are set based on a minimum turning radius unique to the vehicle and on the amount of a shift from the target parking location.

Subsequently, the parking assist ECU 10 starts a parking assist process (step S407). When detecting the driver's removing the foot from the brake of the vehicle 100 or pressing the button for giving an instruction to start parking assist, the parking assist ECU 10 starts parking assist control. At this time, the parking assist ECU 10 transmits information on the calculated parking route, together with an instruction to start the parking assist process, to the vehicle control ECU 11.

Following the end of the parking assist process, the parking assist ECU 10 ends the whole series of steps.

Figure 5:
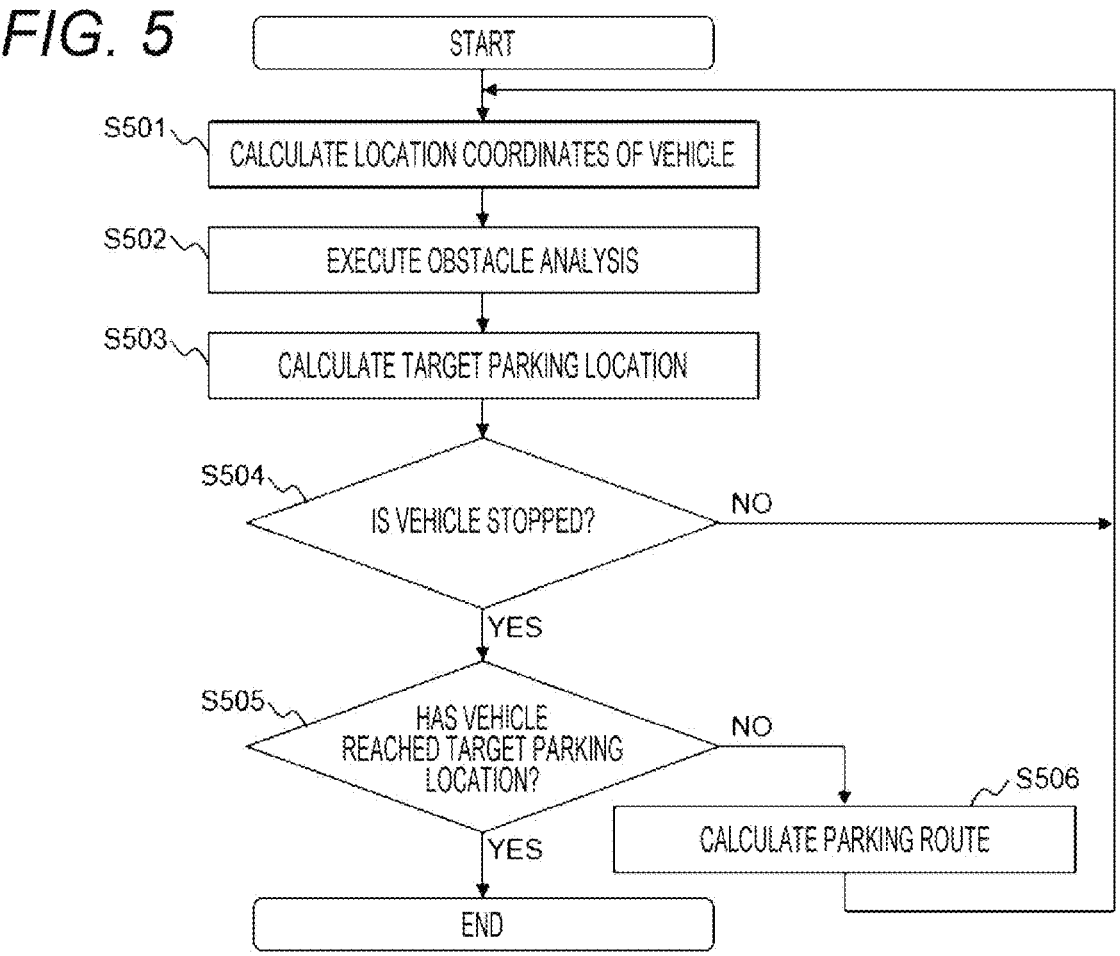
FIG. 5 is a flowchart for explaining an example of a parking assist process executed by the parking assist ECU according to the first embodiment.

FIG. 5 is a flowchart for explaining an example of the parking assist process executed by the parking assist ECU 10 according to the first embodiment.

In the parking assist process, steps described below are executed cyclically. An execution cycle is, for example, 10 ms.

The parking assist ECU 10 calculates the location coordinates of the vehicle 100 (step S501), and transmits the location coordinates of the vehicle 100 to the vehicle control ECU 11. The process of step S501 is the same as the process of step S401.

Based on information of the parking route calculated at step S406 and on the location coordinates of the vehicle 100, the vehicle control ECU 11 assists in driving the vehicle 100 so that the vehicle 100 follows the parking route. Specifically, the vehicle control ECU 11 assists at least in operating the steering wheel, or in operating the accelerator, or in operating the brake.

Subsequently, during parking assist, the parking assist ECU executes an analysis for detecting an obstacle, based on environmental information on the surroundings of the vehicle 100, the environmental information being acquired by the camera 2 or the sonar 3 (step S502). The process of step S502 is the same as the process of step S402.

Subsequently, the parking assist ECU 10 calculates a target parking location, based on the environmental information and obstacle information (step S503). As a result, an existing target parking location is updated.

This method of calculating the target parking location is the same as the above-described method executed at step S403. It should be noted, however, that the parking assist ECU 10 evaluates the accuracy of calculation of the target parking location, and when the accuracy of calculation of the target parking location is improved from the same in the previous calculation, updates the coordinates of the current target parking location to the coordinates of the newly calculated target parking location. In this manner, when a shift between an actual parking frame line and a detected parking frame line becomes smaller during parking assist, the target parking location is updated, which allows the vehicle 100 to be parked at an ideal location.

For example, in a case where the distance between the vehicle 100 and a reference mark (e.g., a parking frame line)

for calculating the target parking location in the current calculation is smaller than the distance between the vehicle 100 and the reference mark in the previous calculation, it is concluded that the accuracy of calculation of the target parking location is improved from the same in the previous calculation. This is one of methods of evaluating the accuracy of calculation of the target parking location.

Subsequently, the parking assist ECU 10 determines whether the vehicle 100 has stopped (step S504).

The vehicle 100 temporarily stops when reaching a wheel-turning location or stops when reaching the target parking location.

When determining that the vehicle 100 is not stopped, the parking assist ECU 10 returns to step S501 and repeats the same process of step S501.

When determining that the vehicle 100 has stopped, the parking assist ECU 10 determines whether the vehicle 100 has stopped because of its reaching the target parking location (step S505).

When determining that the vehicle 100 has stopped because of its reaching the target parking location, the parking assist ECU 10 ends the parking assist process. At this time, the parking assist ECU 10 may instruct the vehicle control ECU 11 to end the parking assist.

When determining that the vehicle 100 has stopped not because of its reaching the target parking location, the parking assist ECU 10 calculates a new parking route leading from the current location of the vehicle 100 to the target parking location (step S506), and transmits information of the calculated parking route to the vehicle control ECU 11. Thereafter, the parking assist ECU 10 returns to step S501 and repeats the same process of step S501.

As it will be described later, the parking assist ECU 10 according to the first embodiment calculates a new parking route by using parameters that are set based on the minimum turning radius unique to the vehicle and on the amount of a shift from the target parking location.

An outline of control of the vehicle 100 during parking assist will then be described with reference to FIGS. 6A, 6B, 6C, 6D, and 7.

FIGS. 6A, 6B, 6C, and 6D are diagrams showing an example of control of the vehicle 100 by the parking assist device according to the first embodiment. FIG. 7 is a graph for explaining a change in the relative distance between a vehicle in travel and a parking frame line.

In FIGS. 6A, 6B, 6C, and 6D, parking assist is executed in accordance with a parking route for parking the vehicle 100 at a target parking location calculated on the basis of parking frame lines 603 and 604. A parked vehicle 602 is present on the left side of parking frame line 603.

Figure 6A:
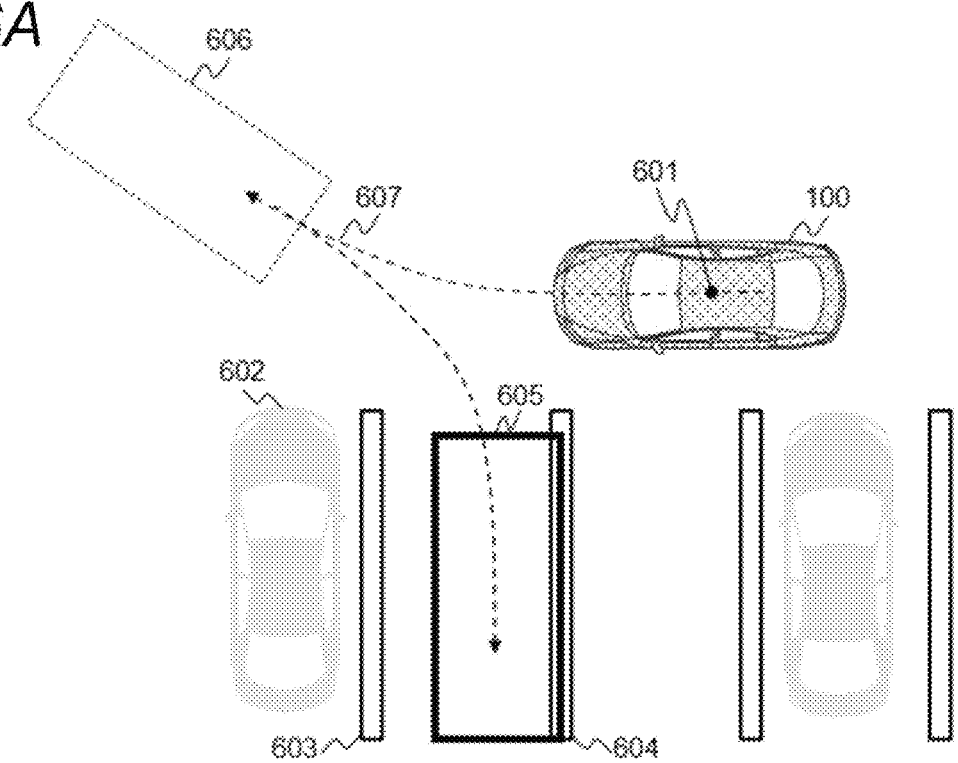
FIG. 6A is a diagram showing an example of control of a vehicle by the parking assist device according to the first embodiment.
Figure 7:
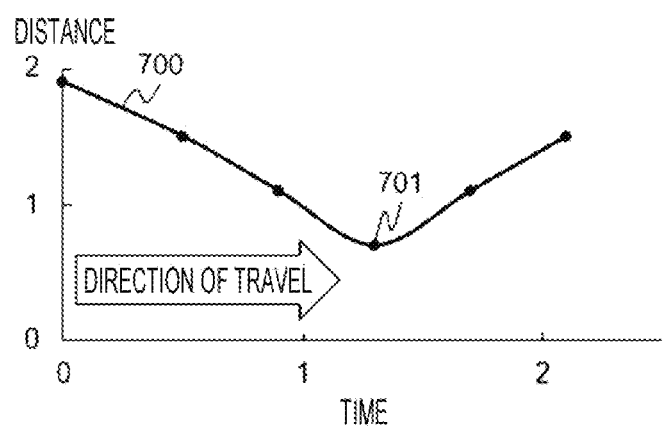
FIG. 7 is a graph for explaining a change in a relative distance between a vehicle in travel and a parking frame line.

FIG. 6A depicts a state of the vehicle 100 after the start of parking assist. A parking-allowing location 605 is a parking-allowing location that has been calculated before the start of parking assist. When the distance between the vehicle 100 and the parking frame lines 603 and 604 is long, a shift between the actual parking frame lines 603 and 604 and the detected parking frame lines 603 and 604 arises. The size of this shift tends to be proportional to the size of the distance between the vehicle 100 and the parking frame lines 603 and 604. Therefore, the amount of a shift between a target parking location, which is calculated based on the detected parking frame lines 603 and 604, and an ideal target parking location, which is calculated based on the actual parking frame lines 603 and 604, also increases in proportion to the distance between the vehicle 100 and the parking frame lines 603 and 604. In other words, the amount of a shift from the target parking location also increases in proportional to the distance between the vehicle 100 and the target parking location. For these reasons, the target parking location (parking-allowing location) 605 calculated in the state shown FIG. 6A is shifted from the ideal target parking location.

When the driver selects the parking-allowing location 605 as the target parking location, the parking assist ECU 10, at step S406, calculates a route 607 as a parking route, the route 607 leading from a vehicle location 601 to the target parking location 605. It should be noted that the route 607 includes a final wheel-turning location 606, at which the vehicle 100 stops and changes its direction of travel from the forward direction to backward direction.

Figure 6B:
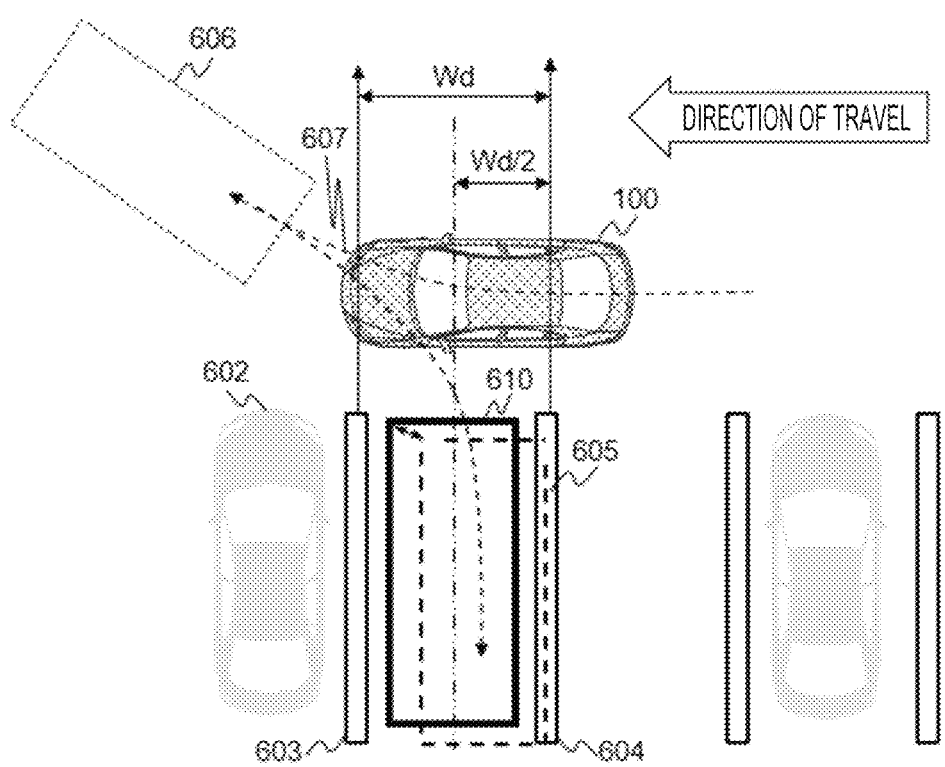
FIG. 6B is a diagram showing an example of control of the vehicle by the parking assist device according to the first embodiment.

FIG. 6B shows a state of the vehicle 100 traveling forward along the parking route 607. In FIG. 6B, the distance between the parking frame line 603 and the parking frame line 604 is defined as Wd.

Now a change in the relative distance between the vehicle 100 and the parking frame lines 603 and 604 will be described with reference to FIG. 7. In FIG. 7, the horizontal axis represents time, and the vertical axis represents the relative distance between the vehicle 100 and the parking frame lines 603 and 604. In this graph, a curve 700 represents time-dependent changes in the relative distance between the vehicle 100 and the parking frame lines 603 and 604. A point 701 represents the relative distance between the vehicle 100 and the parking frame lines 603 and 604 when the left camera 2L mounted on the vehicle 100 is moved from the parking frame line 604 to a point of Wd/2 (the midpoint between the parking frame line 603 and the parking frame line 604).

As indicated in FIG. 7, when the left camera 2L mounted on the vehicle 100 is moved from the parking frame line 604 to the point of Wd/2, the relative distance between the vehicle 100 and the parking frame lines 603 and 604 becomes the minimum. It is widely known that at this time, a shift between a calculated parking-allowing location (target parking location 610) and an ideal parking-allowing location based on the actual parking frame lines 603 and 604 becomes the minimum.

According to this fact, the parking assist ECU 10 updates the target parking location 605 calculated before the start of parking assist to the target parking location 610 with a small shift from the ideal target parking location.

Figure 6C:
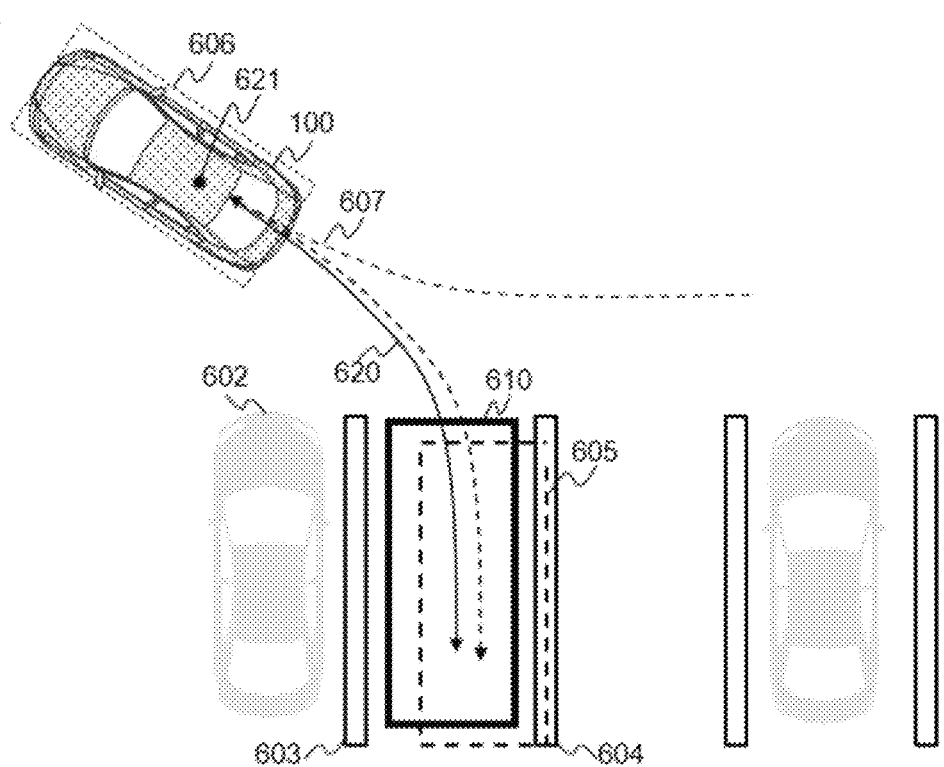
FIG. 6C is a diagram showing an example of control of the vehicle by the parking assist device according to the first embodiment.

FIG. 6C shows a state of the vehicle 100 having reached the final wheel-turning location 606 and stopped.

Because the vehicle 100 is stopped, the parking assist ECU 10 proceeds from step S504 to step S505. Because the stop location is not the target parking location, the parking assist ECU 10 proceeds from step S505 to step S506. At step S506, the parking assist ECU 10 calculates a route 620 as a new parking route, which leads from a vehicle location 621 to the target parking location 610. Thereafter, the parking assist ECU 10 returns to step S501. Information on the new parking route is transmitted to the vehicle control ECU 11. The vehicle control ECU 11 controls the vehicle 100 to cause it to travel along the route 620.

Figure 6D:
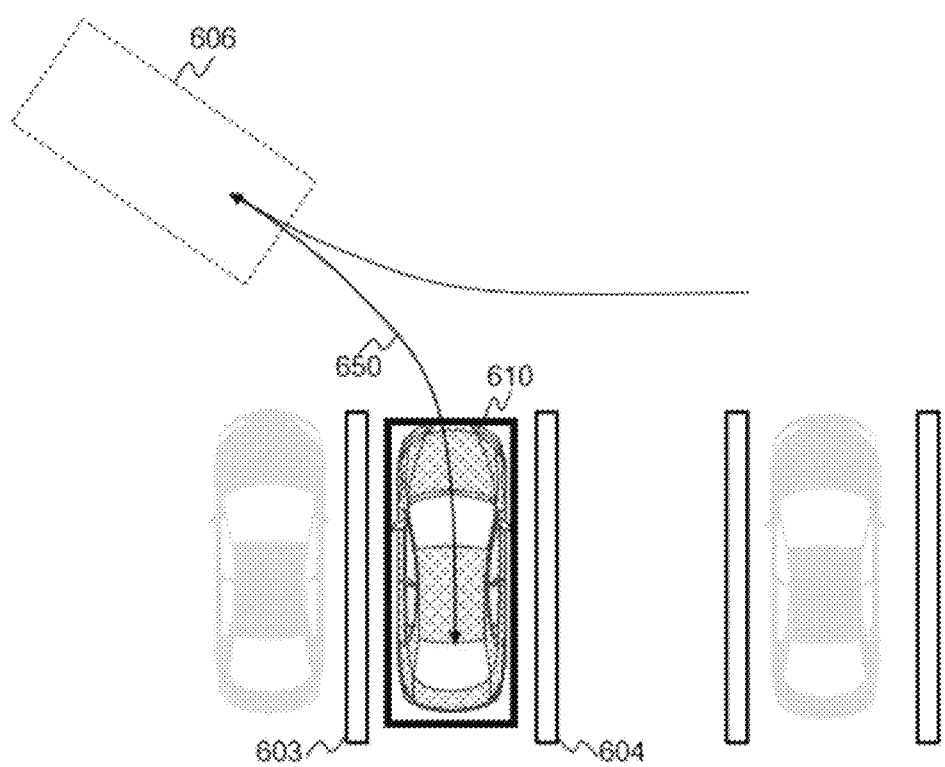
FIG. 6D is a diagram showing an example of control of the vehicle by the parking assist device according to the first embodiment.

FIG. 6D shows a state of the vehicle 100 having reached the target parking location 610.

Because the vehicle 100 is stopped, the parking assist ECU 10 proceeds from step S504 to step S505. Because the stop location is the target parking location, the parking assist ECU 10 ends parking assist.

A method of calculating a parking route will then be described with reference to FIGS. 8A, 8B, 8C, 8D, and 8E.

FIGS. 8A, 8B, 8C, 8D, and 8E are diagrams for explaining an example of a parking route calculation method carried out by the parking assist ECU 10 according to the first embodiment.

In FIGS. 8A, 8B, 8C, 8D, and 8E, parking assist is executed in accordance with a parking route for parking the vehicle 100 at a target parking location that is calculated based on parking frame lines 803 and 804. A parked vehicle 802 is present on the left side of parking frame line 803.

As pre-processing, the parking assist ECU 10 sets a travel-allowing area, which is an area where a parking route can be set, in order to avoid contact between the vehicle 100 and an obstacle, such as a parked vehicle, and unnecessary entry of the vehicle 100 into an area other than the target parking location.

The travel-allowing area is set, based on the passage width of the parking lot, an obstacle present around the vehicle 100, an obstacle present around the target parking location, a parking frame line, and the like.

Figure 8A:
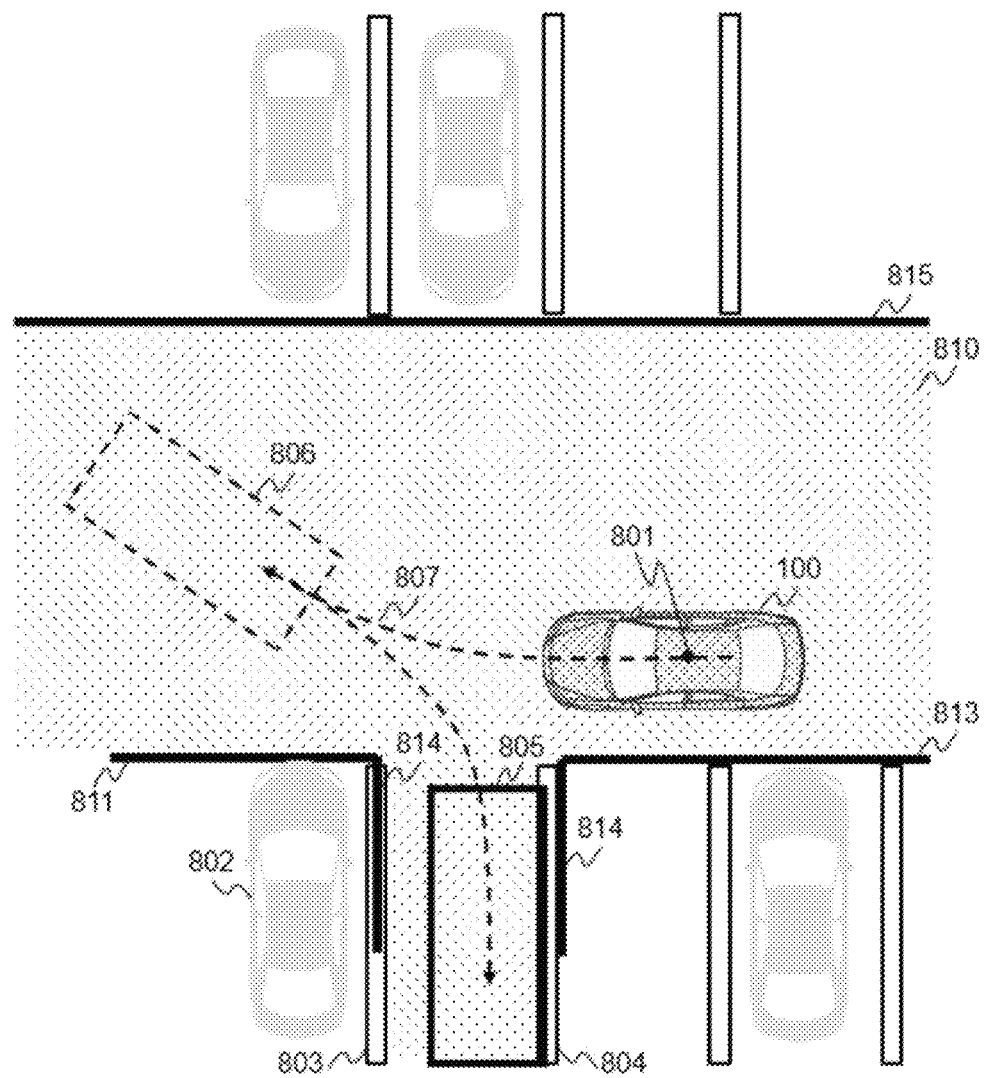
FIG. 8A is a diagram for explaining an example of a parking route calculation method carried out by the parking assist ECU according to the first embodiment.

FIG. 8A shows a state of vehicle 100 when a first parking route is calculated. A parking-allowing location 805 is a parking-allowing location calculated before the start of parking assist.

To avoid coming in contact with a parked vehicle 802 on the left side of the target parking location (parking-allowing location) 805, the parking assist ECU 10 sets boundary lines 811 and 812. To prevent the vehicle 100 from entering a space on the right side of the target parking location 805, the parking assist ECU 10 sets boundary lines 813 and 814 on the right side of the parking frame line 804. To prevent the vehicle 100 from crossing parking frame lines present on the opposite side of the target parking location 805, the parking assist ECU 10 sets a boundary line 815. A T-shaped area 810 formed by the boundary lines 811, 812, 813, 814, and 815 is set as a travel-allowing area. The reason for creating the T-shaped travel-allowing area 810 is that the T-shaped travel-allowing area 810 reduces calculation load resulting from calculation of a parking route or the like. When the calculation capability of the parking assist ECU 10 is high, however, an area that is not T-shaped, e.g., an area of a shape close to a polygon may be set as the travel-allowing area.

The parking assist ECU 10 calculates a route 807 as a parking route in the T-shaped travel-allowing area 810, the route 807 leading from a vehicle location 801 to the target parking location 805. It should be noted that the route 807 includes a final wheel-turning location 806, at which the vehicle 100 stops and changes its direction of travel from the forward direction to backward direction.

(First Calculation Method)

Figure 8B:
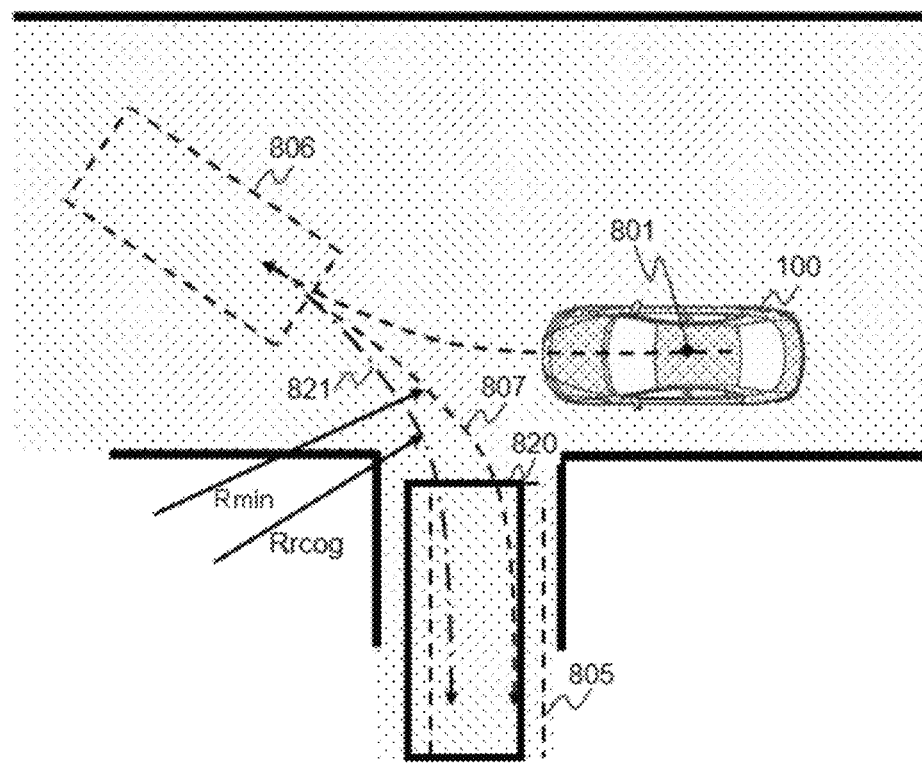
FIG. 8B is a diagram for explaining an example of the parking route calculation method carried out by the parking assist ECU according to the first embodiment.

An example of the parking route calculation method will first be described with reference to FIGS. 8B and 8C. FIG. 8B shows a state of the vehicle 100 at the start of parking assist.

As described with reference to FIG. 6A, the longer the relative distance between the vehicle 100 and the parking frame line is, the larger the amount of a shift between the ideal target parking location and the calculated target parking location becomes. For this reason, the target parking location 805 calculated in the state shown in FIG. 8A is shifted widely from the ideal target parking location.

According to the first embodiment, to set the parking route calculated again as a result of update of the target parking location, as a route that the vehicle 100 can follow, the minimum turning radius used for calculating the parking route (in particular, a route leading from the final wheel-turning location to the target parking location) is set as a value with which a variation in the target parking location can be corrected. Specifically, this minimum turning radius is set based on the minimum turning radius unique to the vehicle and on the amount of a shift from the target parking location.

A problem that arises in a case where the minimum turning radius unique to the vehicle is set as the minimum turning radius used for calculating the parking route will be described.

The route 807 indicated by a dotted line is the parking route leading from the vehicle location 801 to the target parking location 805, and is calculated using a minimum turning radius Rmin unique to the vehicle. Parking assist is started in accordance with the route 807, and during parking assist, the target parking location 805 is updated to a target parking location 820.

When the parking assist ECU 10 calculates a parking route leading from the final wheel-turning location 806 to the target parking location 820, the following problems arise.

(Problem 1) In the case of a parking route through which the vehicle 100 travels from the final wheel-turning location 806 to the target parking location 820 without making a wheel-turning, the accuracy of the parking location deteriorates. This is because that the turning radius of such a route is smaller than the minimum turning radius unique to the vehicle, in which case the vehicle 100 cannot travel along the route.

(Problem 2) When a parking route that the vehicle 100 can follow is calculated to ensure the accuracy of the parking location, the parking route includes a plurality of wheel-turning locations. An increase in wheel-turning locations results in an increase in parking time, and leads to impairment of the convenience of driving assist.

In order to solve the above problems caused by update of the target parking location, according to the first embodiment, when calculating a parking route in response to update of the target parking location, the parking assist ECU 10 sets the minimum turning radius used for calculation of the parking route in such a way as to be able to calculate the parking route that makes the accuracy of the parking location high and that prevents an increase in wheel-turning locations.

According to the first embodiment, a relationship between a variation in the target parking location and the distance between the location of the vehicle 100 at the start of parking assist and a reference mark for calculating the target parking location, such as a parking frame line, is determined in advance, and information (first preset information) on the relationship is set in the parking assist ECU 10. This information may be provided in the form of a table showing a correlation between the variation and the distance, or a function by which the variation is calculated with the distance defined as a variable. In addition, a relationship between the variation in the target parking location and a turning radius that allows correction of the variation in the target parking location is obtained in advance, and information on the relationship (second preset information) is set in the parking assist ECU 10.

When calculating a first parking route, the parking assist ECU 10 calculates an estimated value for the variation in the target parking location, based on the distance between the location of the vehicle 100 and the reference mark for calculating the target parking location and on the first preset information. In addition, based on the calculated variation in the target parking location and the second preset information, the parking assist ECU 10 calculates a turning radius Rrcog that allows correction of the variation in the target parking location, and sets the turning radius Rrcog as a minimum turning radius used for calculation of the first parking route. Using the turning radius Rrcog, the parking assist ECU 10 calculates the route 807 leading from the vehicle location 801 to the target parking location 805.

When the vehicle 100 stops at the final wheel-turning location 806, the parking assist ECU 10 sets a turning radius Rfin, which is smaller than the turning radius Rrcog and larger than the turning radius Rmin, as a minimum turning radius used for calculation of a new parking route. Using the turning radius Rfin, the parking assist ECU 10 calculates a route 821 leading from the final wheel-turning location 806 to the target parking location 820.

As shown in FIG. 8B, even when the target parking location is shifted leftward after the start of parking assist, a parking route which does not include a new wheel-turning location and which the vehicle 100 can follow can be calculated. In addition, as a result of setting the turning radius Rfin larger than the turning radius Rmin, even when the vehicle 100 deviates from the route 821, the turning radius provides room for adjustment. Hence the location of the vehicle 100 can be corrected in such a way as to take a large steering angle (in the direction of reducing the turning radius). As a result, the accuracy of the parking location can be improved.

When a parking route calculated by using the turning radius Rfin is a route including more number of times of wheel-turning operations than a parking route calculated last time, the parking assist ECU 10 may use the parking route calculated last time, instead of using the newly calculated one. In this case, the accuracy of the parking location drops but an increase in the number of times of wheel-turning operations is suppressed, and therefore a time required for parking can be shortened. In a case where a variation in the target parking location is larger than a threshold, it is possible that the accuracy of calculation of the parking-allowing location is problematic, in which case the parking assist ECU 10 may suspend the parking assist.

Figure 8C:
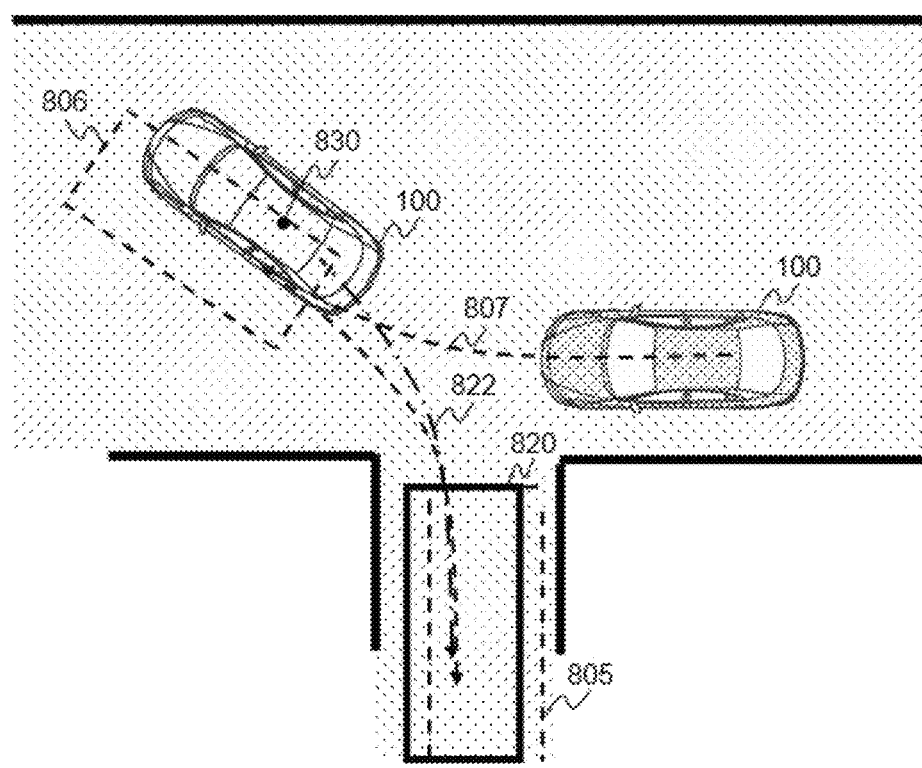
FIG. 8C is a diagram for explaining an example of the parking route calculation method carried out by the parking assist ECU according to the first embodiment.

FIG. 8C shows a state of the vehicle 100 after the start of parking assist.

In addition to a variation in the target parking location, a deterioration in the accuracy of the vehicle 100 following the parking route must also be considered. As shown in FIG. 8C, a vehicle location 830 at the time of the vehicle 100 having reached the final wheel-turning location 806 is away from the final wheel-turning location 806. In other words, this is a state in which the accuracy of the vehicle 100 following the parking route is deteriorated.

When no limitations are placed on the minimum turning radius, the route 821 leading from the final wheel-turning location 806 to the target parking location 820, the route 821 not including a new wheel-turning location, can be calculated. However, when the vehicle 100 is shifted to the right side of the final wheel-turning location 806, as shown in FIG. 8C, a route leading from the vehicle location 830 directly to the target parking location 820 is a route with a turning radius smaller than that of the route 821. When the above-mentioned rightward shift of the vehicle 100 is large, therefore, the turning radius may turn out to be smaller than the minimum turning radius unique to the vehicle, in which case (Problem 1) and (Problem 2) arise due to the deterioration of the accuracy of the vehicle 100 following the parking route.

In order to solve the above problems caused by the deterioration of the accuracy of the vehicle 100 following the parking route, according to the first embodiment, when a parking route is calculated in response to update of the target parking location, the minimum turning radius used for calculation of the parking route is set in such a way as to allow calculation of the parking route that makes the accuracy of the parking location high and that prevents an increase in wheel-turning locations.

In the first embodiment, the maximum value of a shift (the worst value of the accuracy of following the parking route) that develops during travel of a route leading from the location of the vehicle 100 at the start of parking assist to the final wheel-turning location 806 is determined in advance, and information (third preset information) on the maximum value is set in the parking assist ECU 10. For example, information indicating a correlation between the length of the route leading from the location of the vehicle 100 to the final wheel-turning location 806 and the maximum value of the shift is considered to be such information. In addition, a relationship between the maximum value of the shift and a turning radius that allows correction of the shift in the route is determined in advance, and information (fourth preset information) on the relationship is set in the parking assist ECU 10.

When calculating the first parking route, the parking assist ECU 10 calculates the maximum value of the shift, based on the route leading from the location of the vehicle 100 to the final wheel-turning location and on the third preset information. In addition, based on the maximum value of the shift and the fourth preset information, the parking assist ECU 10 calculates a turning radius R2 that allows correction of the shift, and sets the turning radius R2 as a minimum turning radius used for calculation of the first parking route. Using the turning radius R2, the parking assist ECU 10 calculates the route 807 leading from the vehicle location 801 to the target parking location 805. The turning radius R2 is larger than the turning radius Rrcog.

When the vehicle 100 stops at the vehicle location 830 (final wheel-turning location 806), the parking assist ECU 10 sets a turning radius Rfin2, which is smaller than the turning radius R2 and larger than the turning radius Rmin, as a minimum turning radius used for calculation of a new parking route. Using the turning radius Rfin2, the parking assist ECU 10 calculates a route 822 leading from the final wheel-turning location 806 to the target parking location 820.

As shown in FIG. 8C, even when the vehicle 100 stops at a location shifted from the final-wheel turning location 806, a parking route which does not include a new wheel-turning location and which the vehicle 100 can follow can be calculated. In addition, as a result of setting the turning radius Rfin2 larger than the turning radius Rmin, even when the vehicle 100 deviates from the route 822, the turning radius provides room for adjustment. Hence the location of the vehicle 100 can be corrected in such a way as to take a large steering angle (in the direction of reducing the turning radius). As a result, the accuracy of the parking location can be improved.

(Second Calculation Method)

Figure 8D:
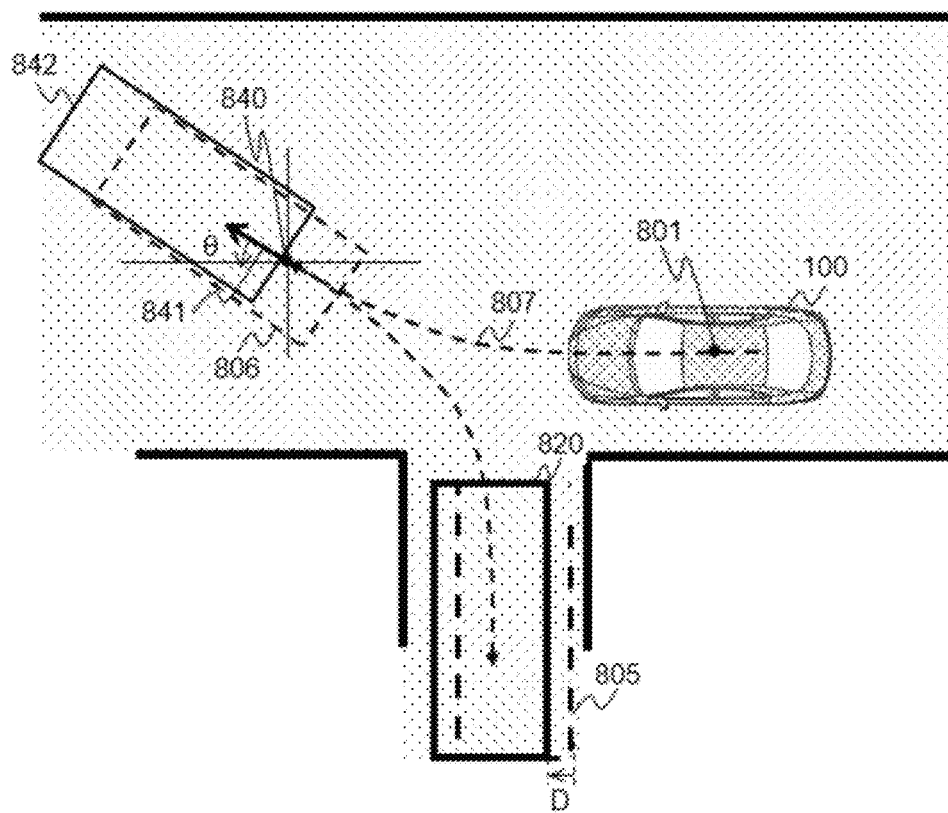
FIG. 8D is a diagram for explaining an example of the parking route calculation method carried out by the parking assist ECU according to the first embodiment.

Another parking route calculation method will then be described with reference to FIGS. 8D and 8E. FIG. 8D shows a state of the vehicle 100 at the start of parking assist.

As described with reference to FIG. 6A, the longer the relative distance between the vehicle 100 and the parking frame line is, the larger the amount of a shift between the ideal target parking location and the calculated target parking location becomes. For this reason, the target parking location 805 calculated in the state shown in FIG. 8D is shifted widely from the ideal target parking location. Thus, (Problem 1) and (Problem 2) arise due to update of the target parking location.

To solve (Problem 1) and (Problem 2) caused by update of the target parking location, the parking assist ECU 10 adds a linear route to a route leading to the final wheel-turning location 806 when calculating a new parking route.

In the first embodiment, the minimum turning radius Rmin unique to the vehicle is set in the parking assist ECU 10 as the minimum turning radius used for calculation of the parking route, and the first preset information is also set in the same. In addition, a relationship between a variation in the target parking location and the length of a linear route that allows correction of the variation in the target parking location is determined in advance, and information on the relationship (fifth preset information) is set in the parking assist ECU 10. This information may be provided in the form of a table showing a correlation between the variation and the distance, or a function by which the variation is calculated with the distance defined as a variable.

It is conceivable, for example, that the fifth preset information is retained as a function expressed by formula (1). In formula (1), L denotes the length of the linear route, θ denotes an approach angle of the vehicle 100 at the final wheel-turning location, and D denotes a variation in the target parking location.

[Formula 1]

$$L = \frac{D}{\cos\theta} \quad (1)$$

When calculating the first parking route, the parking assist ECU 10 calculates the route 807 leading from the vehicle location 801 to the target parking location 805, using the minimum turning radius unique to the vehicle.

When the target parking location 805 is not updated, the vehicle 100 makes a wheel-turn at the final wheel-turning location 806 and travels backward to the target parking location 805.

When the target parking location 805 is updated to the target parking location 820, (Problem 1) and (Problem 2) arise due to the update of the target parking location.

To avoid such a case, when the vehicle 100 stops at the final wheel-turning location 806, the parking assist ECU 10 calculates an estimated value for the variation in the target parking location, based on the distance between the location of the vehicle 100 and the reference mark for the target parking location and on the first preset information. In addition, the parking assist ECU 10 calculates the length L of the linear route, based on the variation in the target parking location and on the fifth preset information. The parking assist ECU 10 adds a linear route 841 with the calculated length L to wheel-turning coordinates 840 at which a wheel-turn is started in the route 807, and calculates a parking route in which a location 842 is set as a new final wheel-turning location.

By applying the method as described above, the steering angle can be increased in the route leading from the final wheel-turning location to the target parking location. This, therefore, makes it possible to calculate a parking route that includes no wheel-turning operation in its extension from the final wheel-turning location to the target parking location and that the vehicle 100 can follow.

Figure 8E:
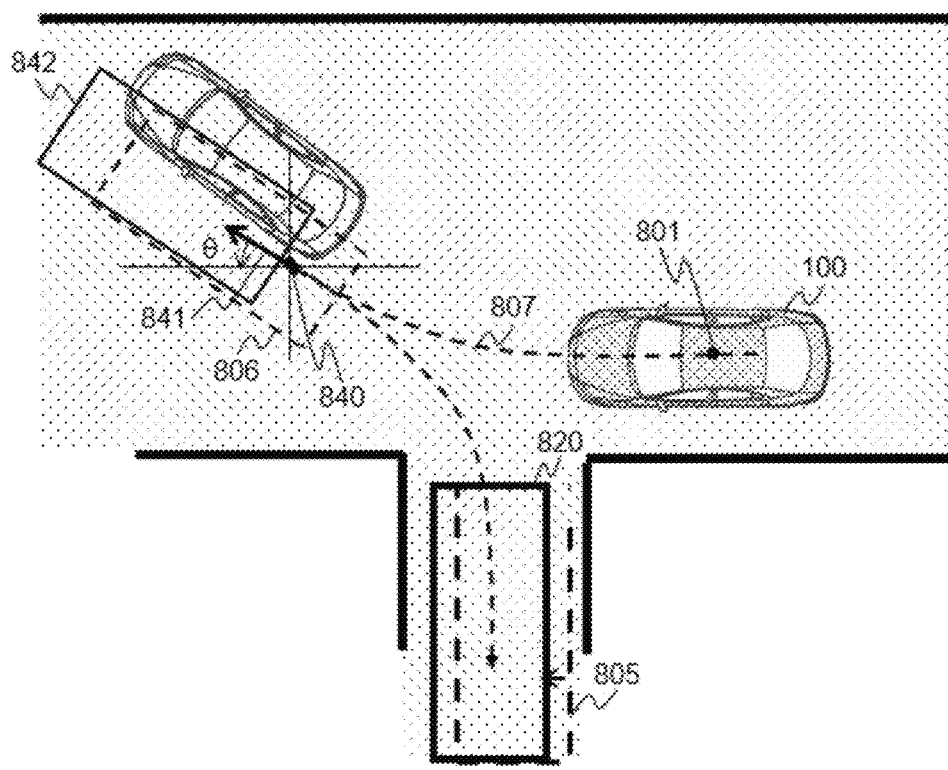
FIG. 8E is a diagram for explaining an example of the parking route calculation method carried out by the parking assist ECU according to the first embodiment.

FIG. 8E shows a state of the vehicle 100 after the start of parking assist.

As described with reference to FIG. 8C, in addition to a variation in the target parking location, a deterioration in the accuracy of the vehicle 100 following the parking route must also be considered.

As shown in FIG. 8E, the vehicle location 830 at the time of the vehicle 100 having reached the final wheel-turning location 806 is away from the final wheel-turning location 806. In other words, this is a state in which the accuracy of the vehicle 100 following the parking route is deteriorated.

When no limitations are placed on the minimum turning radius, a route leading from the final wheel-turning location 806 to the target parking location 820, the route not including a new wheel-turning location, can be calculated. However, when the vehicle 100 is shifted to the right side of the final wheel-turning location 806, as shown in FIG. 8E, a route leading from the vehicle location 830 directly to the target parking location 820 is a route with a turning radius smaller than that of the route 807. When the above-mentioned rightward shift of the vehicle 100 is large, therefore, the turning radius may turn out to be smaller than the minimum turning radius unique to the vehicle, in which case (Problem 1) and (Problem 2) arise due to the deterioration of the accuracy of the vehicle 100 following the parking route.

To solve (Problem 1) and (Problem 2) caused by the deteriorated accuracy of the vehicle 100 following the parking route, the parking assist ECU 10 adds a linear route to a route leading to the final wheel-turning location 806 when calculating a new parking route.

In the first embodiment, the minimum turning radius Rmin unique to the vehicle is set in the parking assist ECU 10 as the minimum turning radius used for calculation of the parking route, and the third preset information is also set in the same. In addition, a relationship between the maximum value of the shift and the length of the linear route that allows correction of the shift in the route is determined in advance, and information (sixth preset information) on the relationship is set in the parking assist ECU 10.

When calculating the first parking route, the parking assist ECU 10 calculates the route 807 leading from the vehicle location 801 to the target parking location 805, using the minimum turning radius unique to the vehicle.

When the vehicle 100 stops at the vehicle location 830 (final wheel-turning location 806), the parking assist ECU 10 calculates the maximum value of the shift, based on the route leading from the location of the vehicle 100 to the final wheel-turning location and on the third preset information. In addition, the parking assist ECU 10 calculates the length L2 of the linear route, based on the maximum value of the shift and on the sixth preset information. The parking assist ECU 10 adds the linear route 841 with the calculated length L2 to wheel-turning coordinates 840 at which a wheel-turn is started in the route 807, and calculates a parking route in which the location 842 is set as a new final wheel-turning location. The length L2 of the linear route is greater than the length L of the linear route.

By applying the method as described above, the steering angle can be increased in the route leading from the final wheel-turning location to the target parking location. This, therefore, makes it possible to calculate a parking route that includes no wheel-turning operation in its extension from the final wheel-turning location to the target parking location and that the vehicle 100 can follow.

A combination of the first calculation method and the second calculation method offers the same effects as described above.

In the first calculation method, as attention is paid to the fact that the shift between the ideal target parking location and the calculated target parking location increases in proportional to the distance between the vehicle 100 and the reference mark for the target parking location, such as the parking frame line, the turning radius Rrcog or the turning radius R2 may be set such that it becomes smaller as the vehicle 100 is closer to the target parking location at the start of parking assist. Likewise, in the second calculation method, the linear route may be set such that its length becomes shorter as the vehicle 100 is closer to the target parking location at the start of parking assist. In other words, at least either the turning radius or the length of the linear route may be set such that it is proportional to the distance between the vehicle 100 and the target parking location. This allows calculation of a proper parking route.

As described above, the parking assist device according to the first embodiment can calculate a parking route that the vehicle 100 can follow and that suppresses an increase in the number of times of wheel-turning operations even when a target parking location is updated during parking assist. The parking assist device that achieves the improved accuracy of a parking location, a reduced time required for parking, and the improved convenience of parking assistance, therefore, can be provided.

It should be noted that the present invention is not limited to the above-described embodiments but includes various modifications. For example, the above-described embodiments have been described in detail for easy understanding of the present invention, and are not necessarily limited to embodiments having all the constituent elements described. Some or all of the above-described constituent elements, functions, processing units, processing means, and the like may be provided in the form of hardware, such as properly designed integrated circuits. In addition, the above-described constituent elements, functions, and the like may be provided in the form of software-based programs by causing a processor to interpret and execute programs for implementing the constituent elements/functions. Information for implementing functions, such as programs, tables, and files, may be stored in a storage device, such as a memory, a hard disk, and a solid state drive (SSD), or in a recording medium, such as an IC card, an SD card, and a DVD.

A group of control lines/data lines considered to be necessary for the description are illustrated, and all control lines/data lines making up the product are not necessarily illustrated. It is safe to assume that, actually, almost the entire constituent elements are interconnected.

REFERENCE SIGNS LIST 2 camera
3 sonar
5 steering wheel
6 electric power steering
7 wheel
8 wheel speed sensor
9 in-vehicle display device
10 parking assist ECU
10A I/O LSI
10B CPU
11 vehicle control ECU
18 steering wheel
100 vehicle
301 vehicle-to-be-parked location estimating unit
302 obstacle information analyzing unit
303 parking-allowing location calculation unit
304 parking route calculation unit

The invention claimed is:

1. A parking assist device that assists in performing an operation of parking a vehicle, the parking assist device comprising:
a memory; and
a processor that is communicatively coupled to the memory,
wherein the processor is configured to:
calculate and update a parking-allowing location, that being a space where the vehicle can be parked, a plurality of times before the vehicle stops at the parking-allowing location,
calculate a parking route leading from a current location of the vehicle to the parking-allowing location, wherein
the processor sets a minimum turning radius for calculating the parking route, based on an amount of a shift between the parking-allowing location not updated and the parking-allowing location having been updated and on an amount of a shift of the vehicle from the parking route, and calculates the parking route using the minimum turning radius, and wherein
the minimum turning radius is set to be larger than a minimum value of a turning radius unique to the vehicle.

2. The parking assist device according to claim 1, wherein when calculating a new parking route after a new parking-allowing location is calculated by the processor, the processor sets a value as a minimum turning radius for calculating the new parking route, the value being larger than the minimum value of the turning radius unique to the vehicle and smaller than a minimum turning radius used for calculation of a parking route calculated last time.

3. The parking assist device according to claim 1, wherein the parking route is a route including a wheel-turning location at which the vehicle changes a direction of travel, and wherein
when calculating a new parking route after a new parking-allowing location is calculated by the processor, the processor adds a linear route with a given length to the wheel-turning location in a parking route calculated last time, thereby calculating the new parking route.

4. The parking assist device according to claim 3, wherein the processor sets a length of the linear route so that a turning radius of the parking route extending from the wheel-turning location is larger than a turning radius of the parking route calculated last time and extending from the wheel-turning location, based on the amount of the shift between the parking-allowing location not updated and the parking-allowing location having been updated and on an amount of a shift of the vehicle from the parking route.

5. The parking assist device according to claim 4, wherein at least one of the minimum turning radius or the length of the linear route is set proportional to a distance between the vehicle and the parking-allowing location.

6. The parking assist device according to claim 1, wherein the processor stops assisting in performing an operation of parking the vehicle when the amount of the shift between the parking-allowing location not updated and the parking-allowing location having been updated is larger than a threshold.

7. The parking assist device according to claim 1, wherein when a new parking route has been calculated, the processor determines whether or not to update the parking route, based on a result of comparison between a number of times of wheel-turning operations included in the new parking route and a number of times of wheel-turning operations included in a parking route calculated last time.

\* \* \* \* \*